(12) United States Patent  
Mori

(10) Patent No.: US 7,013,479 B2  
(45) Date of Patent: Mar. 14, 2006

(54) BROADCASTING APPARATUS AND METHOD FOR PRE-TRANSMITTING DATA CAROUSEL AND RECEIVING APPARATUS FOR RECEIVING DATA CAROUSEL

(75) Inventor: Toshiya Mori, Settsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 1098 days.

(21) Appl. No.: 09/834,454

(22) Filed: Apr. 13, 2001

(65) Prior Publication Data

US 2001/0037507 A1 Nov. 1, 2001

(30) Foreign Application Priority Data

Apr. 14, 2000 (JP) .............................. 2000-113732

(51) Int. Cl.  
*H04N 7/173* (2006.01)  
*H04N 7/16* (2006.01)

(52) U.S. Cl. ..................... 725/93; 725/91; 725/114; 725/116

(58) Field of Classification Search .................. 725/32, 725/34, 36, 91–97, 100, 114, 116, 131, 139, 725/151, 135–137, 93, 134, 142  
See application file for complete search history.

(56) References Cited

U.S. PATENT DOCUMENTS

| | | | | |
|---|---|---|---|---|
| 5,751,336 A | * | 5/1998 | Aggarwal et al. | 725/146 |
| 5,990,927 A | * | 11/1999 | Hendricks et al. | 725/132 |
| 6,047,317 A | * | 4/2000 | Bisdikian et al. | 725/142 |
| 6,144,400 A | * | 11/2000 | Ebisawa | 725/101 |
| 6,157,809 A | * | 12/2000 | Kambayashi | 725/91 |
| 6,415,438 B1 | * | 7/2002 | Blackketter et al. | 725/136 |
| 6,591,420 B1 | * | 7/2003 | McPherson et al. | 725/29 |
| 2002/0152477 A1 | * | 10/2002 | Goodman et al. | 725/141 |
| 2004/0261127 A1 | * | 12/2004 | Freeman et al. | 725/135 |
| 2005/0076357 A1 | * | 4/2005 | Fenne | 725/14 |

FOREIGN PATENT DOCUMENTS

| | | |
|---|---|---|
| EP | 827340 | 3/1998 |
| EP | 830019 | 3/1998 |
| EP | 998145 | 5/2000 |
| JP | 10126753 | 5/1998 |
| WO | 0049807 | 8/2000 |

* cited by examiner

*Primary Examiner*—Chris Kelley  
*Assistant Examiner*—Farzana E. Hossain

(57) ABSTRACT

A broadcasting system including a broadcasting apparatus and a receiving apparatus. The broadcasting apparatus transmits an interactive content as a data carousel during a scheduled broadcasting time period, starts pre-transmitting the interactive content a predetermined time before the start of the scheduled broadcasting time period, and repeatedly transmits a cache message instructing a receiving apparatus to cache the interactive content into a storage unit while the interactive content is transmitted during the predetermined time period. The receiving apparatus receives and reproduces the interactive content, and caches the interactive content into a storage unit, not reproducing the interactive content, while the interactive content is received before the start of a scheduled broadcasting time period, and reproduces the interactive content during the scheduled broadcasting time period.

19 Claims, 9 Drawing Sheets

FIG. 3  BROADCAST PROGRAM TABLE 101a

| BROAD-CASTING DATE | CHANNEL CODE | PROGRAM START TIME | PROGRAM END TIME | PROGRAM MANAGEMENT CODE | PROGRAM TITLE | PROGRAM ADDITIONAL DATA FLAG |
|---|---|---|---|---|---|---|
| 1999/1/1 | 10 | 8:00 | 9:00 | 1001 | PROGRAM A | OFF |
| | | 9:00 | 9:30 | 1002 | PROGRAM B | OFF |
| | | 9:30 | 10:00 | 1003 | PROGRAM C | OFF |
| | | 10:00 | 11:00 | 1004 | PROGRAM D | ON |
| | | 11:00 | 12:00 | 1005 | PROGRAM E | ON |
| | | ... | ... | ... | ... | ... |
| | 11 | 6:00 | 7:00 | 1101 | PROGRAM A' | OFF |
| | | ... | ... | ... | ... | ... |

FIG. 4 BROADCAST PROGRAM DETAILED TABLE 101b

| BROAD-CASTING DATE | CHANNEL CODE | PROGRAM MANAGEMENT CODE | TRANSMISSION START TIME | TRANSMISSION END TIME | VIDEO MATERIAL MANAGEMENT CODE | AUDIO MATERIAL MANAGEMENT CODE | COMMERCIAL MATERIAL MANAGEMENT CODE | PROGRAM ADDITIONAL DATA FLAG |
|---|---|---|---|---|---|---|---|---|
| 1999/1/1 | 10 | 1004 | 10:00 | 11:00 | V1000 | A1000 | | ON |
| | | | 11:00 | 11:15 | V1001 | A1001 | | OFF |
| | | 1005 | 11:15 | 11:20 | | | C1001 | ON |
| | | | 11:20 | 11:30 | V1002 | A1002 | | OFF |
| | 11 | | 11:30 | 12:00 | V1003 | A1003 | | OFF |
| | | ... | ... | ... | ... | ... | ... | ... |

FIG. 5

DATA BROADCAST SCHEDULING TABLE 110a

| BROAD-CASTING DATE | CHANNEL CODE | PROGRAM MANAGEMENT CODE | TRANSMISSION START TIME | TRANSMISSION END TIME | DATA BROADCAST CONTENT MANAGEMENT CODE |
|---|---|---|---|---|---|
| 1999/1/1 | 10 | 1004 | 9:55 | 11:00 | D1000 |
| | | 1005 | 11:10 | 11:20 | D1001 |
| | 11 | ... | ... | ... | ... |

FIG. 6

MESSAGE SCHEDULING TABLE 110b

| BROAD-CASTING DATE | CHANNEL CODE | PROGRAM MANAGEMENT CODE | TRANSMISSION START TIME | TRANSMISSION END TIME | TRANSMISSION INTERVAL (SEC) | MESSAGE |
|---|---|---|---|---|---|---|
| 1999/1/1 | 10 | 1004 | 9:55 | 10:00 | 5 | CACHE MESSAGE |
| | | | 10:00 | 10:00 | 0 | DISPLAY SWITCH MESSAGE |
| | | | 11:00 | 11:00 | 0 | DISPLAY SWITCH MESSAGE |
| | | 1005 | 11:10 | 11:15 | 5 | CACHE MESSAGE |
| | | | 11:15 | 11:15 | 0 | DISPLAY SWITCH MESSAGE |
| | | | 11:20 | 11:20 | 0 | DISPLAY SWITCH MESSAGE |
| | 11 | ... | ... | ... | ... | ... |
| | | | | | | ... |

BROADCASTING APPARATUS AND METHOD FOR PRE-TRANSMITTING DATA CAROUSEL AND RECEIVING APPARATUS FOR RECEIVING DATA CAROUSEL

BACKGROUND OF THE INVENTION (1) Field of the Invention

The present invention relates to a broadcasting apparatus for broadcasting a data carousel, a receiving apparatus for receiving the data carousel, and a method and an apparatus for caching contents that are synchronized with broadcast programs or commercials.

(2) Description of Related Art

Digital broadcast programs include ordinary broadcast programs such as movies or dramas, and data broadcast programs. Ordinary broadcast programs are mainly composed of video streams and audio streams. Receiving apparatuses reproduces the ordinary broadcast programs the instant they receive them. The data broadcast programs achieve a pseudo interactive operation with viewers by repeatedly transmitting broadcast program data at intervals of 5 seconds, for example.

A method of repeatedly transmitting contents of data broadcast programs is called data carousel method. An international standard defines a DSM-CC data carousel method (hereinafter referred to as carousel method), where DSM-CC stands for Digital Storage Media Command and Control. For detailed information, refer to the standard: ISO/IEC 13818-6 "Information Technology—Generic Coding of Moving Pictures and Associated Audio—Part 6: Extensions for DSM-CC". Japanese BS digital broadcasting has also adopted the carousel method as a method of transmitting multimedia data broadcasts. For detailed information, refer to the standard ARIB STD-B24: "Data Broadcast Encoding and Transmission for Digital Broadcasting" by the Association of Radio Industries and Businesses.

In reproducing a data broadcast program, a receiving apparatus interactively selects, receives, and reproduces a content in accordance with user instructions. In this case, after a viewer selects a content while another content is reproduced and displayed on the screen, the user must wait one cycle of the responding transmission at the maximum until the selected content is displayed. A technique for reducing the wait time is disclosed in Japanese Laid-Open Patent Application No. 10-126753 "Terminal apparatus that performs, using cache, high-speed display of operator-selected video data among great amount of video data broadcast in one way, and method for use in the terminal apparatus". This technique allows a user-selected content to be immediately reproduced and displayed by caching into a memory a content having a high possibility of being displayed next to the currently displayed content.

The above technique has a problem, however, that immediately after a data broadcast program begins, the broadcast data for the program has not been cached at all. This causes a problem that immediately after a data broadcast program begins, the user must wait for some time until a response for an interactive operation is displayed.

SUMMARY OF THE INVENTION

It is therefore an object of the present invention to provide a broadcasting apparatus (method), a receiving apparatus (method), a program recording medium, and a program that enable the receiving apparatus to immediately display a response to an interactive operation even immediately after a data broadcast program is started.

The above object is fulfilled by a broadcasting apparatus comprising; a transmitting means for transmitting an interactive content as a data carousel over a span of a scheduled broadcasting time period; and a transmission control means for controlling the transmitting means so as to (a) start pre-transmitting the interactive content a predetermined time before the start of the scheduled broadcasting time period, and (b) repeatedly transmit a cache message that instructs a receiving apparatus to cache the interactive content into a storage unit in the receiving apparatus while the transmitting means pre-transmits the interactive content over a span of the predetermined time period.

With the above construction, the broadcasting apparatus pre-transmits the interactive content prior to a scheduled broadcast, and transmits the cache message. As a result, the receiving apparatus stores the interactive content into the storage unit thereof by the time the scheduled broadcast starts, and can immediately display an image in response to any possible interactive operation without causing the user to wait even immediately after a data broadcast program is started.

In the above broadcasting apparatus, the scheduled broadcasting time period may span from a time when the receiving apparatus is to start reproducing the interactive content to a time when the receiving apparatus is to end reproducing the interactive content.

In the above broadcasting apparatus, the transmission control means may control the transmitting means so as to transmit a reproduction message that conveys that the interactive content cached in the storage unit in the receiving apparatus should be reproduced over the span of the scheduled broadcasting time period.

With the above construction, the receiving apparatus starts reproducing the interactive content cached in the receiving apparatus upon receipt of the reproduction message from the transmitting apparatus at any time.

In the above broadcasting apparatus, the transmitting means may further broadcast a video content over the span of the scheduled broadcasting time period, the video content containing video and audio data, and the interactive content is closely related to the video content.

In the above broadcasting apparatus, the video content may be a commercial and is synchronized with the interactive content.

In the above broadcasting apparatus, the video content may be one of a movie, a drama, a sports broadcast program, and a news broadcast program, and the interactive content is either an introduction or a detail of the video content.

With the above construction, the receiving apparatus can start reproducing the interactive content in synchronization with the start of reproduction of the video content, and can immediately display an image in response to any possible interactive operation without causing the user to wait even immediately after a data broadcast program is started. Since the video content is synchronized with the interactive content, the user of the receiving apparatus can enjoy all the interactive operations immediately after the broadcast of the video content is started.

The above object is also fulfilled by a receiving apparatus comprising: a receiving means for receiving an interactive content which is transmitted as a data carousel; a reproducing means for reproducing the received interactive content; and a reception control means for controlling the reproducing means so as to (a) cache the interactive content into a storage unit, not reproducing the interactive content, while the interactive content is received before the start of a scheduled broadcasting time period, and (b) reproduce the interactive content during the scheduled broadcasting time period.

The above receiving apparatus may further receive a cache message that instructs to cache the interactive content, where the reception control means caches the interactive content into the storage unit in accordance with the received cache message.

With the above construction, the receiving apparatus stores the interactive content into the storage unit thereof by the time the scheduled broadcast starts, and can immediately display an image in response to any possible interactive operation without causing the user to wait even immediately after a data broadcast program is started.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 shows an example of the broadcast program table 101a created by the broadcast program scheduling unit 101;

FIG. 4 shows an example of the broadcast program detailed table 101b created by the broadcast program scheduling unit 101;

FIG. 5 shows an example of the data broadcast scheduling table 110a created by the data broadcast schedule planning unit 110;

FIG. 6 shows an example of the message scheduling table 110b created by the data broadcast schedule planning unit 110;

DESCRIPTION OF THE PREFERRED EMBODIMENTS

Figure 1:
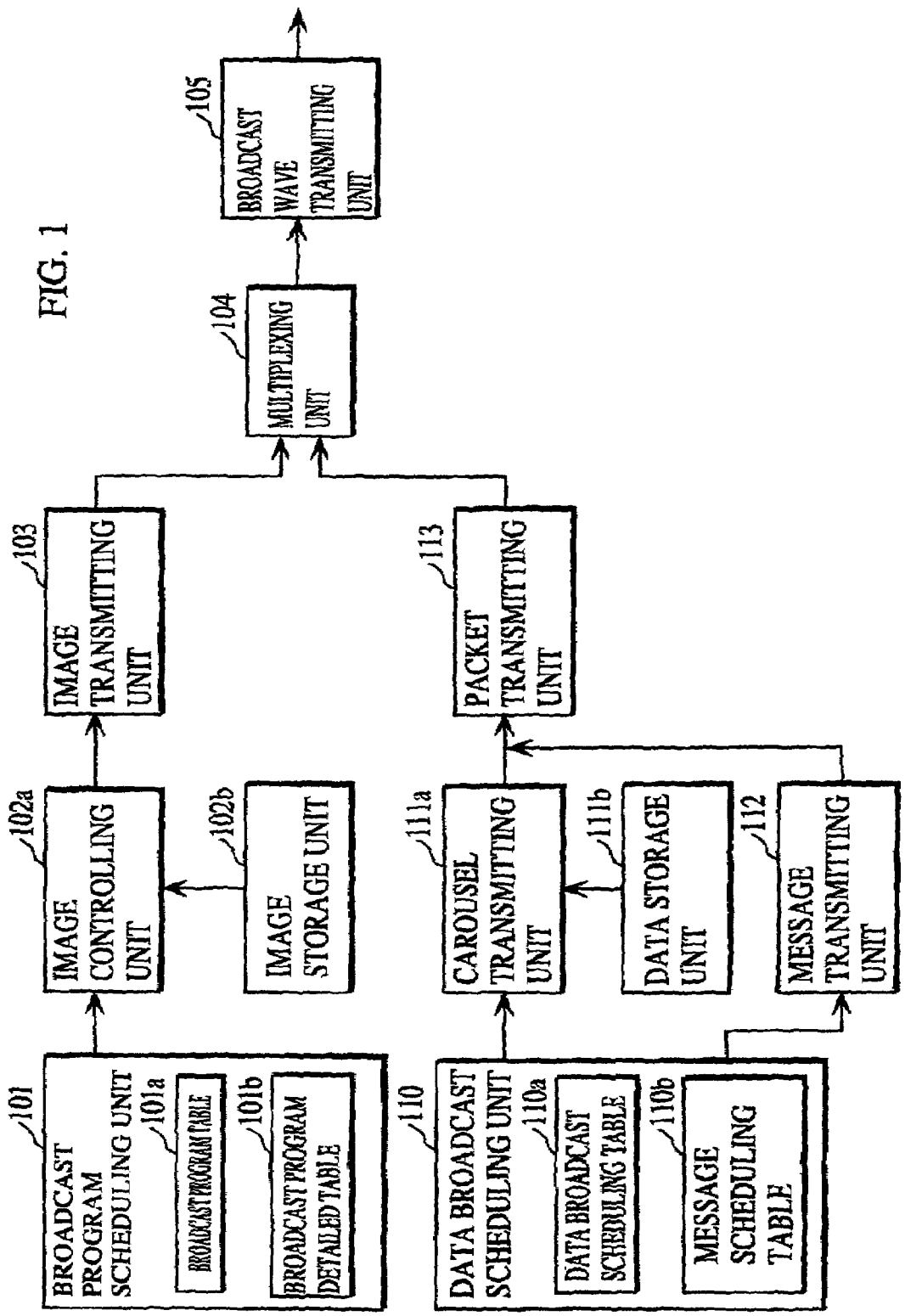
FIG. 1 is a block diagram showing the construction of a broadcasting apparatus in the broadcasting system in the present embodiment.

The following is a description of a broadcasting system in an embodiment of the present invention by way of referring to the drawings.

Construction of Broadcasting Apparatus

FIG. 1 is a block diagram showing the construction of a broadcasting apparatus in the broadcasting system in the embodiment.

As shown in FIG. 1, the broadcasting apparatus includes a broadcast program scheduling unit 101, an image controlling unit 102a, an image storage unit 102b, an image transmitting unit 103, a multiplexing unit 104, a broadcast wave transmitting unit 105, a data broadcast scheduling unit 110, a carousel transmitting unit 111a, a data storage unit 111b, a message transmitting unit 112, and a packet transmitting unit 113.

The broadcast program scheduling unit 101, having an Electronic Data Processing System (EDPS) and a Data Server (DS), plans a schedule of broadcast programs (also referred to as contents) that include images and sounds. The EDPS plans a long-term schedule of broadcast programs spanning several weeks, and manages simplified information (broadcast program table 101a) of the broadcast programs. The DS plans a short-term schedule of broadcast programs spanning several days, and manages detailed information (broadcast program detailed table 10b) of the broadcast programs, including scheduling of commercials for each broadcast program.

The image controlling unit 102a is an Automatic Program Control System (APC) that controls reproduction of video/audio data stored in the image storage unit 102b in accordance with the broadcast program detailed table 102b. The image storage unit 102b is a library (e.g., video tape) that stores broadcast program data or commercial data composed of video and audio data. The image storage unit 102b is reproduced by a Videocassette Recorder (VCR) contained in the APC.

The image transmitting unit 103 converts (encodes) video and audio signals reproduced by the image controlling unit 102a into digital data. The image transmitting unit 103 is, for example, achieved by an HDTV encoder and converts video and audio signals into Transport Stream (TS) packets conforming to Motion Picture Expert Group 2 (MPEG2).

The multiplexing unit 104 is an MPEG2 multiplexer that multiplexes (a) TS packets output from the image transmitting unit 103 and (b) packet data output from the packet transmitting unit 113.

The broadcast wave transmitting unit 105 modulates the TS packets output from the multiplexing unit 104 into broadcast waves and transmits the broadcast waves.

The data broadcast scheduling unit 110 plans a schedule of data broadcast programs, and creates a data broadcast scheduling table 110a and a message scheduling table 110b.

Figure 9B:
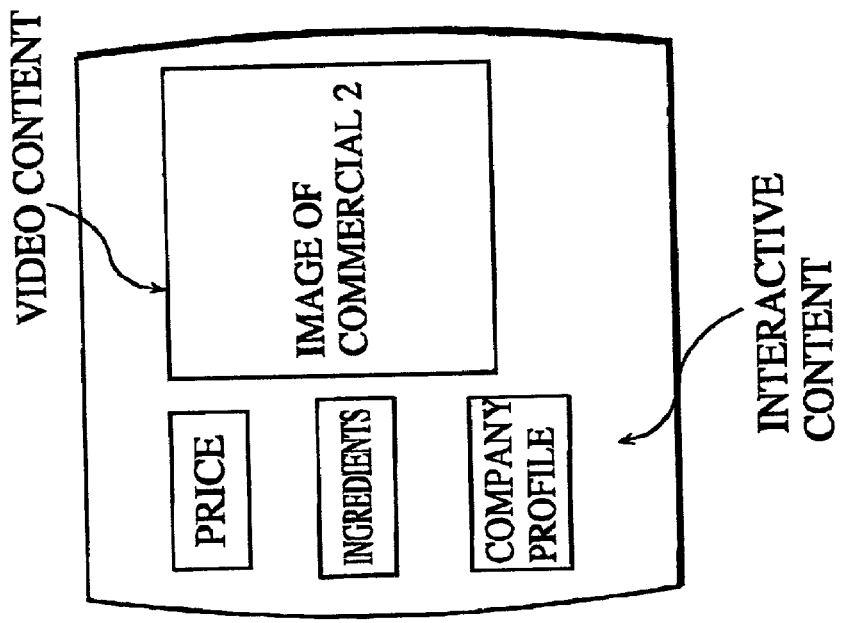
FIGS. 9A and 9B shows examples of displayed images of a video content and an interactive content synchronized with the video content.
Figure 9A:
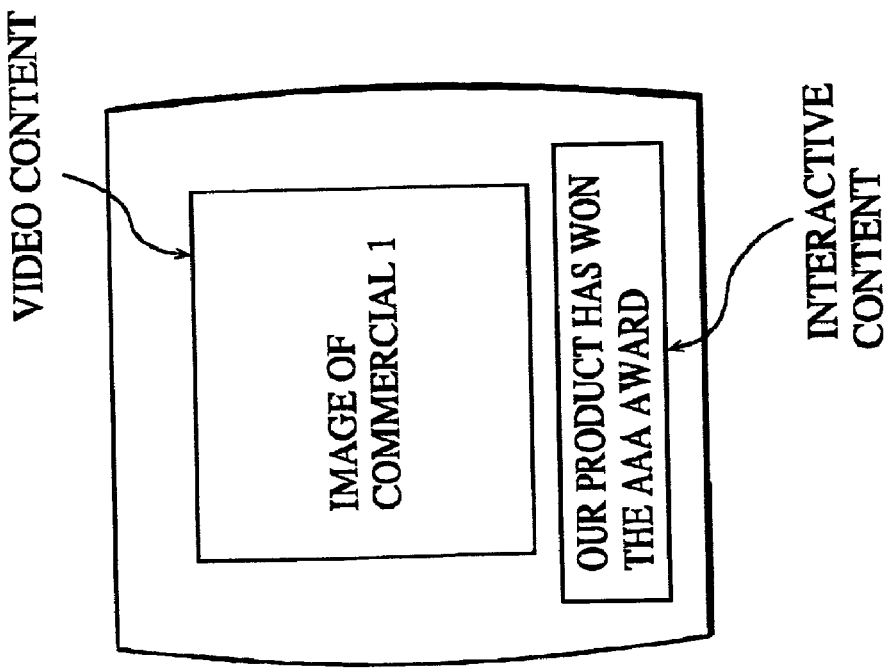

The data broadcast scheduling table 110a is a transmission schedule table for the data broadcast programs (hereinafter, contents of the data broadcast programs are referred to as interactive contents). The data broadcast schedule planning unit 110 creates the data broadcast scheduling table 110a so that a data broadcast program that synchronizes with a broadcast program shown in the broadcast program detailed table 101b is broadcast prior to the broadcast program. Hereinafter, contents of the broadcast programs shown in the broadcast program detailed table 101b are referred to as video contents. Here, synchronization of a data broadcast program (interactive content) with a broadcast program (video content) means that reduced-size display images of the video content are displayed on the same screen on which the interactive content is displayed, as shown in FIGS. 9A and 9B. In this case, when the video content is a movie, the interactive content synchronizing with it may be an introduction of the movie or the casting, for example. Also, when the video content is a commercial, the interactive content synchronizing with it may be an introduction of the sponsor or the product. When the video content is a sports program, the interactive content synchronizing with it may be an introduction of the players. Here, it is also possible for the viewer to view the video content with its full size as an independent broadcast program.

The message scheduling table 110b shows the schedule of transmitting a cache message and a reproduction message. The cache message conveys that an interactive content should be cached into a storage unit of a receiving apparatus while the interactive content is repetitively pre-transmitted to the receiving apparatus prior to a synchronized video content. The cache message is repetitively transmitted while the interactive content is pre-transmitted prior to the synchronized video content. The reproduction message conveys that an interactive content cached in the storage unit of the receiving apparatus should be reproduced at the time when the synchronized video content starts being broadcast.

The carousel transmitting unit 111a reads, in accordance with the schedule shown in the data broadcast scheduling table 110a, a data broadcast content from the data storage unit 111b, and converts the read data broadcast content into a data carousel. Here, the term "carousel" indicates repetitive transmission of a data broadcast content, as defined in the Digital Storage Media Command and Control (DSM-CC) in the MPEG2 standard, and the data having the data format conforming to the DSM-CC is referred to as data carousel.

The message transmitting unit 112 transmits the cache message and the reproduction message in accordance with the schedule shown in the message scheduling table 110b.

The packet transmitting unit 113 converts the data output from the carousel transmitting unit 111a and the message transmitting unit 112 into TS packets, and transmits the TS packets to the multiplexing unit 104.

Construction of Receiving Apparatus

Figure 2:
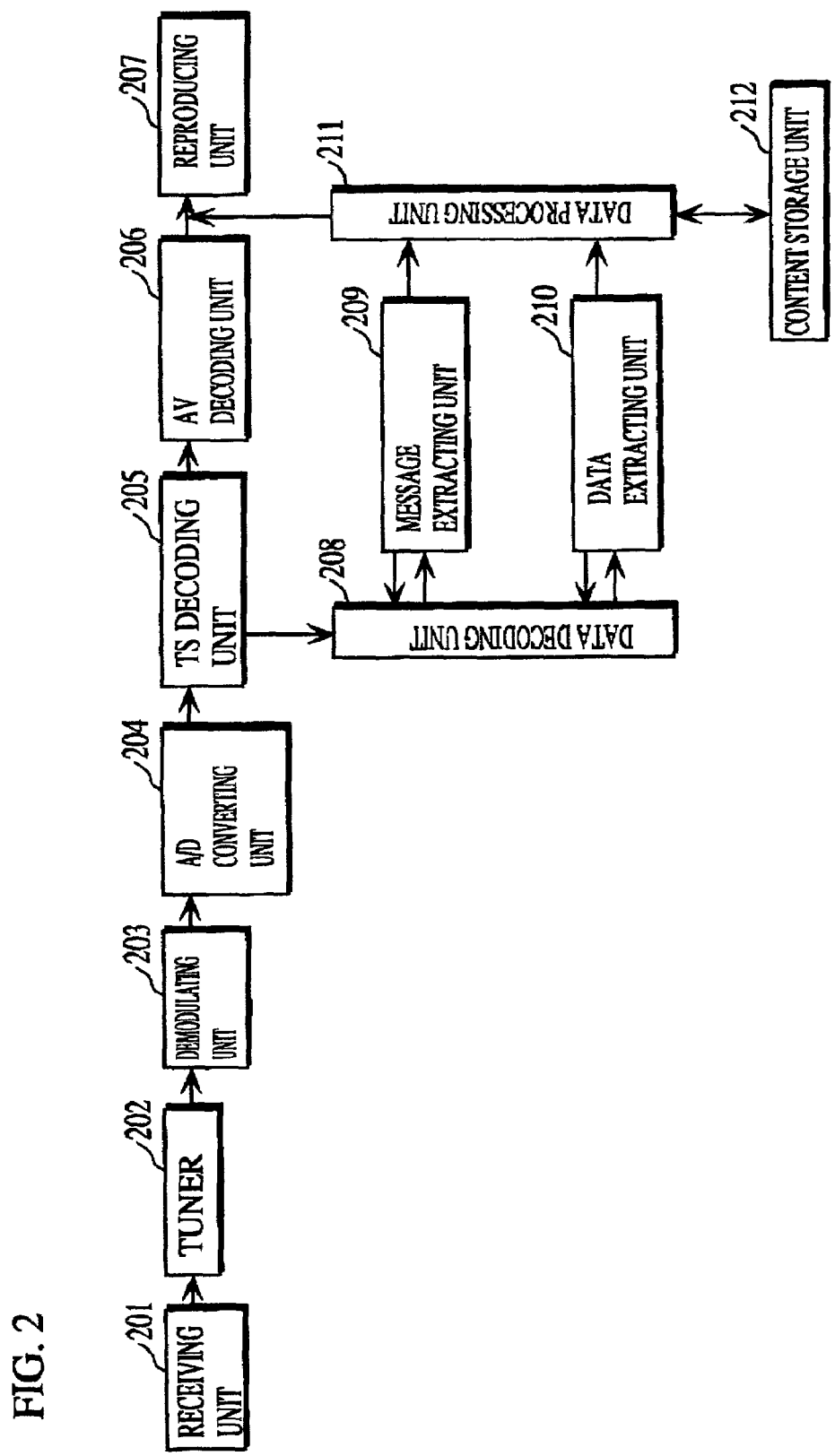
FIG. 2 is a block diagram showing the construction of a receiving apparatus in the present embodiment.

FIG. 2 is a block diagram showing the construction of a receiving apparatus in the present embodiment. As shown in FIG. 2, the receiving apparatus includes a receiving unit 201, a tuner 202, a demodulating unit 203, an A/D converting unit 204, a TS decoding unit 205, an AV decoding unit 206, a reproducing unit 207, a data decoding unit 208, a message extracting unit 209, a data extracting unit 210, a data processing unit 211, and a content storage unit 212.

The receiving unit 201, achieved by a parabolic antenna or the like, receives a broadcast wave.

The tuner 202 tunes to the broadcast wave.

The demodulating unit 203 demodulates the broadcast wave to which the tuner 202 has tuned.

The A/D converting unit 204 converts the demodulated broadcast wave to digital data (Transport Stream (TS)).

The TS decoding unit 205 decodes the TS (digitized broadcast wave).

The AV decoding unit 206 decodes elementary streams (video streams, audio streams or the like) output from the TS decoding unit 205, and outputs video and audio data.

The reproducing unit 207 reproduces the video and audio data output from the AV decoding unit 206.

The data decoding unit 208 decodes data other than video streams and audio streams.

The message extracting unit 209 extracts the cache message or the reproduction message from the decoding results output from the data decoding unit 208.

The data extracting unit 210 extracts the content of the data broadcast program (interactive content) from the decoding results output from the data decoding unit 208.

The data processing unit 211 interprets and executes (a) the interactive content extracted by the data extracting unit 210 and (b) the cache message or the reproduction message extracted by the message extracting unit 209. More specifically, when the message extracting unit 209 outputs the cache message, the data processing unit 211 writes the interactive content obtained from the data extracting unit 210 into the content storage unit 212, not outputting to the reproducing unit 207; and when the message extracting unit 209 outputs the reproduction message, the data processing unit 211 reads an interactive content from the content storage unit 212 in accordance with a user instruction, and outputs the read interactive content to the reproducing unit 207.

The content storage unit 212 stores the data broadcast contents in accordance with the instructions of the data processing unit 211.

Broadcast Program Table 101a, Broadcast Program Detailed Table 101b

FIG. 3 shows an example of the broadcast program table 101a created by the broadcast program scheduling unit 101.

As shown in FIG. 3, the broadcast program table 101a shows "broadcasting date", "channel code", "program start time", "program end time", "program management code", "program title", and "program additional data flag" for each broadcast program that is represented by a video content.

Here, the "program start time" and the "program end time" correspond to (a) the transmission start time and the transmission end time in the broadcasting apparatus and (b) the reproduction start time and the reproduction end time in the receiving apparatus, respectively. The "program additional data flag" indicates whether the broadcast program is synchronized with a data broadcast program. In this example, as shown in FIG. 3, none of the broadcast programs A, B, and C is synchronized with a data broadcast program (interactive content), and the broadcast programs D and E are synchronized with data broadcast programs.

FIG. 4 shows an example of the broadcast program detailed table 101b created by the broadcast program scheduling unit 101. FIG. 4 shows only a portion of the table 101b that is related to the broadcast program D (program management code 1004) and the broadcast program E (program management code 1005) which are synchronized with data broadcast programs, as indicated by the "program additional data flags" in the broadcast program table 101a shown in FIG. 3.

As shown in FIG. 4, the broadcast program detailed table 101b shows "broadcasting date", "channel code", "program management code", "transmission start time", "transmission end time", "video material management code", "audio material management code", "commercial material management code", and "program additional data flag" for each broadcast program.

The broadcast program table 101a and the broadcast program detailed table 101b are referred to by the image controlling unit 102a. During a time period between the transmission start time and the transmission end time shown in the broadcast program detailed table 101b, the image controlling unit 102a reads from the image storage unit 102b the materials specified by the "video material management code", "audio material management code", and "commercial material management code" of the broadcast program detailed table 101b, and outputs the read materials to the image transmitting unit 103. The image transmitting unit 103 encodes and digitizes the materials, then outputs the materials to the multiplexing unit 104.

Data Broadcast Scheduling Table 110a, Message Scheduling Table 110b

FIG. 5 shows an example of the data broadcast scheduling table 110a created by the data broadcast schedule planning unit 110.

As shown in FIG. 5, the data broadcast scheduling table 110a shows "broadcasting date" on which the data broadcast content is broadcast, "channel code", "program management code", "transmission start time", "transmission end time", and "data broadcast content management code".

FIG. 5 shows only a portion of the table 110a that is related to the data broadcast programs (interactive contents) which are synchronized with the broadcast programs with the program management codes 1004 and 1005 for which the "program additional data flags" are ON in the broadcast program detailed table 101b shown in FIG. 4.

The data broadcast scheduling table 110a shown in FIG. 5 indicates, for example, that the data broadcast content (data broadcast content management code D1000) with the broadcast program management code 1004 starts being transmitted at 9:55 on Jan. 1, 1999, and ends being transmitted at 11:00. The data broadcast content with the broadcast program management code 1004 is synchronized with the broadcast program D (with the program additional data flag ON) that appears in the broadcast program table 101a shown in FIG. 3 and the broadcast program detailed table 101b shown in FIG. 4.

It should be noted here that according to the broadcast program detailed table 101b, while the broadcast program D is transmitted from the transmission start time 10:00 to the transmission end time 11:00, the data broadcast content (management code D1000), which is broadcast in synchronization with the broadcast program D as additional data thereof, is transmitted from the transmission start time 9:55 to the transmission end time 11:00. That is to say, the 5 minutes between 9:55 and 10:00 is provided as what we call a pre-transmission period. As understood from this, the pre-transmission period is provided to a data broadcast content which is broadcast in synchronization with a video content as additional data thereof.

Similarly, while the broadcast program E is transmitted from 11:15 to 11:20, the data broadcast content (management code D1001), which is broadcast in synchronization with the broadcast program E, is transmitted from 11:10 to 11:20. That is to say, the 5 minutes between 11:10 and 11:15 is provided as the pre-transmission period.

FIG. 6 shows an example of the message scheduling table 110b created by the data broadcast schedule planning unit 110.

As shown in FIG. 6, the message scheduling table 110b shows "broadcasting date" on which the message is broadcast, "channel code", "program management code", "transmission start time", "transmission end time", "transmission cycle", and "message content".

The message scheduling table 110b shown in FIG. 6 indicates that the cache message is repeatedly transmitted at intervals of 5 seconds during the 5-minute pre-transmission period (9:55–10:00), for the data broadcast content (broadcast program management code 1004) that is synchronized with the broadcast program D that appears in the broadcast program table 101a shown in FIG. 3. FIG. 6 also indicates that a display switch message (reproduction message) is transmitted at the end of the pre-transmission period (10:00), i.e., at the reproduction start time in the receiving apparatus. FIG. 6 also indicates that a display switch message (reproduction stop message) is transmitted at the broadcast end time of 11:00.

The two types of display switch messages are both immediate-type. The reproduction message instructs the receiving apparatus to immediately reproduce the data broadcast content cached in the receiving apparatus when the receiving apparatus receives this message. The reproduction stop message instructs the receiving apparatus (a) to immediately stop reproducing the data broadcast content cached in the receiving apparatus and (b) to delete the cached data broadcast content, when the receiving apparatus receives this message.

These messages are generated by the message transmitting unit 112 so as to conform to the DSM-CC section format.

Operation

The operation of the broadcasting system of the present invention with the above-described construction will be described.

Operation Example 1

Figure 7:
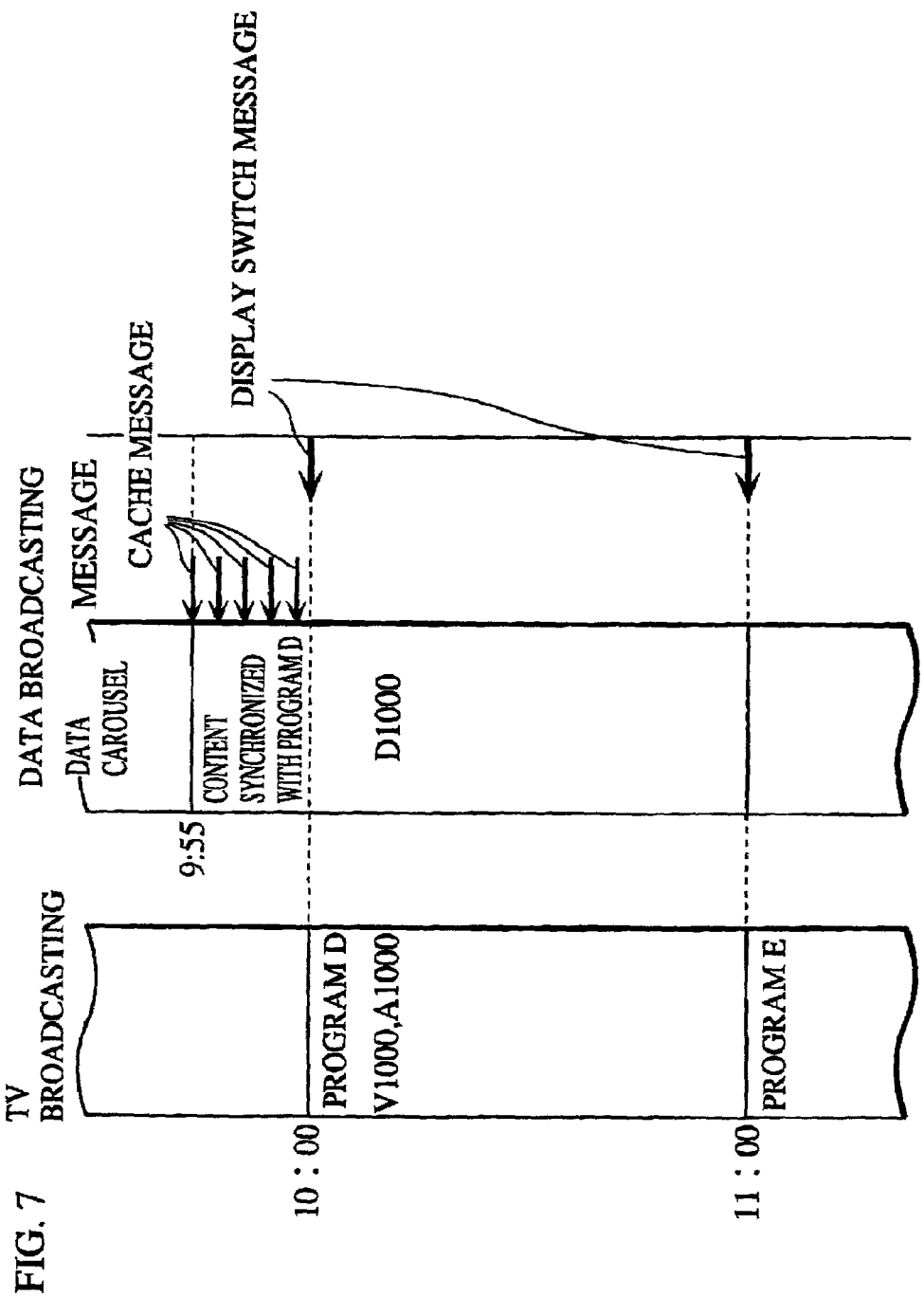
FIG. 7 shows how data related to the broadcast program D is transmitted from the transmitting apparatus.

FIG. 7 shows how data related to the broadcast program D is transmitted from the transmitting apparatus. The left-hand side of FIG. 7 labeled as "TV broadcasting" shows the broadcast program D (video content), and the right-hand side of FIG. 7 labeled as "data broadcasting" shows the data broadcast program that is synchronized with the broadcast program D. On the right of the data broadcast program, the timing for transmitting messages is shown.

The image controlling unit 102a refers to the broadcast program table 101a shown in FIG. 3, and selects, before 10:00 on Jan. 1, 1999, the broadcast program D for which the broadcasting date is defined as Jan. 1, 1999, the channel code 10, the program start time 10:00, the program end time 11:00, the program management code 1004, and the program title Program D, and obtains the broadcast program detailed table 101b. The image controlling unit 102a extracts from the table 101b shown in FIG. 4 a piece of broadcast program detailed information for which the broadcasting date is defined as Jan. 1, 1999, the channel code 10, and the transmission start time 10:00, and reproduces the materials specified as having the video material management code V1000 and the audio material management code A1000 in the broadcast program detailed table 101b, starting at 10:00, Jan. 1, 1999, and outputs the reproduced materials to the image transmitting unit 103.

The image transmitting unit 103 encodes and digitizes the signals of the reproduced materials with the video and audio material management codes V1000 and A1000, then outputs the materials to the multiplexing unit 104. The multiplexing unit 104 multiplexes the received packets of data into a stream. The stream is transmitted as a broadcast wave via the broadcast wave transmitting unit 105.

As shown in FIG. 7 and described above, the broadcast program D scheduled to be broadcast from 10:00 to 11:00 is broadcast by encoding and multiplexing the materials with the video and audio material management codes V1000 and A1000.

The carousel transmitting unit 111a refers to the data broadcast scheduling table 110a shown in FIG. 5, and reads the data broadcast content with the data broadcast content management code D1000 from the data storage unit 111b to generate carousel data, and outputs the carousel data to the packet transmitting unit 113, starting at 9:55, Jan. 1, 1999. The carousel data is broadcast during the pre-transmission period as a broadcast wave via the multiplexing unit 104 and the broadcast wave transmitting unit 105. In this way, the data broadcast content (D1000) that is found to be synchronized with the broadcast program D by referring to the data broadcast scheduling table 111a shown in FIG. 5 is broadcast from 9:55 to 11:00.

The message transmitting unit 112 generates section data from the cache message and transmits the section data to the packet transmitting unit 113 at intervals of 5 seconds from 9:55 to 10:00 on Jan. 1, 1999, in accordance with the message scheduling table 110b shown in FIG. 6. The section data is broadcast as a broadcast wave via the packet transmitting unit 113, multiplexing unit 104, and broadcast wave transmitting unit 105.

The message transmitting unit 112 also transmits the reproduction start message at 10:00 and the reproduction stop message at 11:00.

As shown in FIG. 7, the data broadcast content D1000 synchronized with the broadcast program D is transmitted during a period of 9:55 to 11:00. Also, the cache message is transmitted during a period of 9:55 to 10:00, and the reproduction message is transmitted during a period of 10:00 to 11:00.

The receiving apparatus shown in FIG. 2 operates as follows.

As shown in FIG. 7, the cache message and the data broadcast content D1000 synchronized with the broadcast program D are transmitted at 9:55. The message extracting unit 209 obtains the cache message, and the data extracting unit 210 obtains the data broadcast content D1000.

The data processing unit 211 stores the data broadcast content into the content storage unit 212 in accordance with the cache message.

At 10:00, the reproduction message is transmitted from the broadcasting station. The message extracting unit 209 obtains the reproduction message and outputs it to the data processing unit 211.

The data processing unit 211 checks whether the data broadcast content is stored in the content storage unit 212. In this example, the data broadcast content is stored in the content storage unit 212. When this happens, the data processing unit 211 interprets and executes the data broadcast content, and outputs the data broadcast content to the reproducing unit 207. In this way, the data broadcast content is reproduced and displayed, in synchronization with the broadcast program D.

As described above, the data broadcast content has been stored in the content storage unit 212 by the time when the data broadcast content starts being reproduced and displayed. With this construction, the receiving apparatus can quickly respond to a possible interactive instruction of the user, without causing the user to wait for some time before receiving the response.

At 11:00, the reproduction stop message is transmitted by the broadcasting station. The message extracting unit 209 obtains the reproduction message and outputs it to the data processing unit 211.

The data processing unit 211 checks whether the data broadcast content is stored in the content storage unit 212. In this example, the data broadcast content is stored in the content storage unit 212. When this happens, the data processing unit 211 stops displaying the currently displayed data broadcast content, and deletes the data broadcast content from the content storage unit 212.

Operation Example 2

Figure 8:
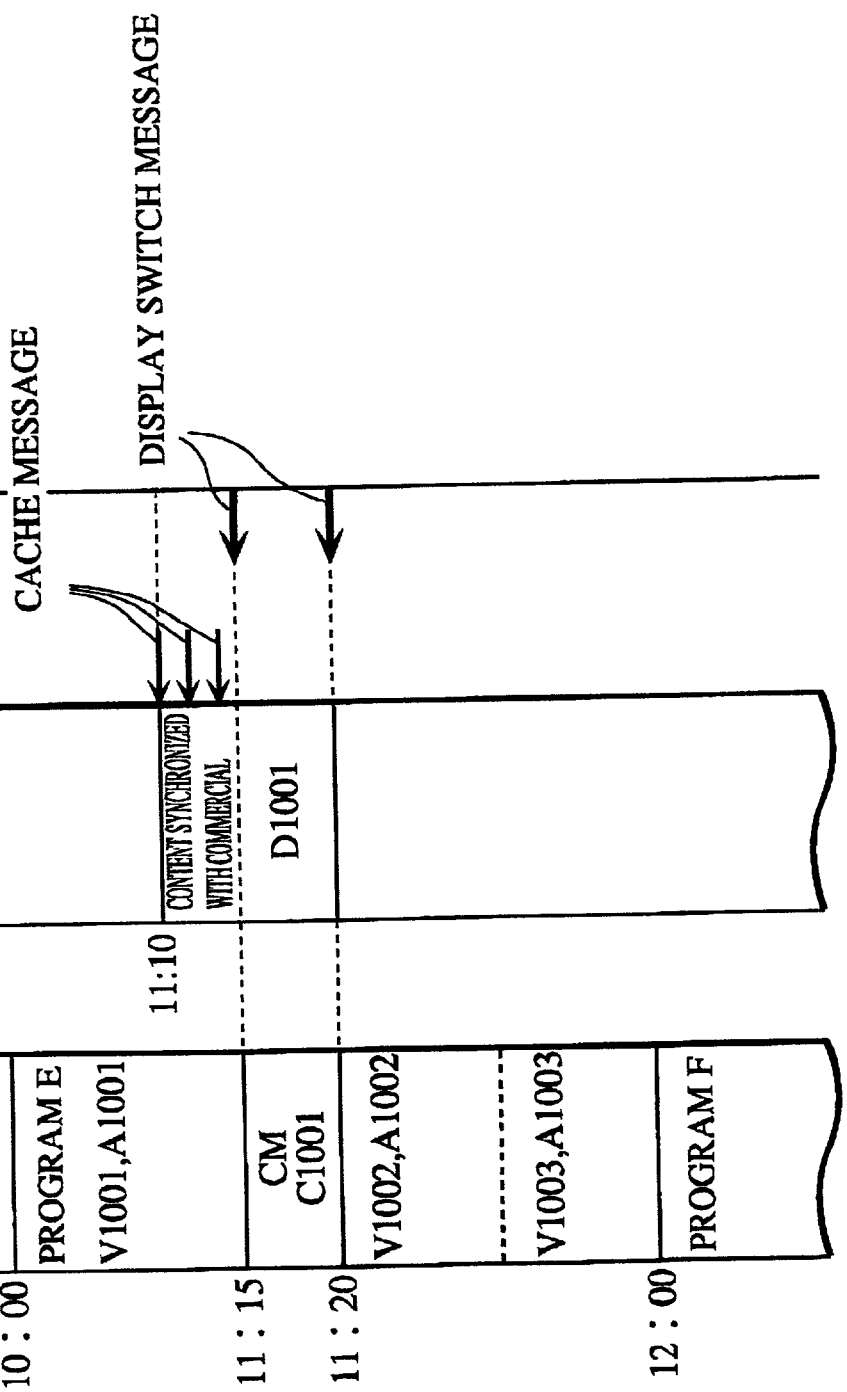
FIG. 8 shows how data related to the broadcast program E is transmitted from the transmitting apparatus.

FIG. 8 shows how data related to the broadcast program E is transmitted from the transmitting apparatus.

The image controlling unit 102a refers to the broadcast program table 101a shown in FIG. 3, and selects, before 11:00 on Jan. 1, 1999, the broadcast program E for which the broadcasting date is defined as Jan. 1, 1999, the channel code 10, the program start time 11:00, the program end time 12:00, the program management code 1005, and the program title Program E, and obtains the broadcast program detailed table 101b.

The image controlling unit 102a extracts from the table 101b shown in FIG. 4 a piece of broadcast program detailed information for which the broadcasting date is defined as Jan. 1, 1999, the channel code 10, and the transmission start time 11:00, 11:15, 11:20, and 11:30, and reproduces the materials specified as having the video material management code V1001 and the audio material management code A1001 from 11:00 (transmission start time) to 11:15 (transmission end time), and outputs the reproduction signals to the image transmitting unit 103.

The image transmitting unit 103 encodes and digitizes the signals of the reproduced materials with the video and audio material management codes V1001 and A1001, then outputs the materials to the multiplexing unit 104. The multiplexing unit 104 multiplexes the received packets of data into a stream. The stream is transmitted as a broadcast wave via the broadcast wave transmitting unit 105.

Similarly, the material with the commercial material management code C1001 is broadcast from 11:15 to 11:20; the materials with the video and audio material management codes V1002 and A1002 are broadcast from 11:20 to 11:30; and the materials with the video and audio material management codes V1003 and A1003 are broadcast from 11:30 to 12:00.

The carousel transmitting unit 111a refers to the data broadcast scheduling table 110a shown in FIG. 5, and generates carousel data from the data broadcast content with the data broadcast content management code D1001 at 11:10 Jan. 1, 1999. The carousel data is broadcast as a broadcast wave via the packet transmitting unit 113, multiplexing unit 104, and broadcast wave transmitting unit 105. In this way, the data broadcast content (D1001) synchronized with the broadcast program E is transmitted as a "pre-transmission", and is further transmitted until 11:20.

The message transmitting unit 112 generates section data from the cache message and transmits the section data to the packet transmitting unit 113 at intervals of 5 seconds from 11:10 to 11:15 on Jan. 1, 1999, in accordance with the message scheduling table 110b shown in FIG. 6. The section data is broadcast as a broadcast wave via the packet transmitting unit 113, multiplexing unit 104, and broadcast wave transmitting unit 105. Similarly, the reproduction start message is transmitted at 11:15, and the reproduction stop message is transmitted at 11:20.

Now, the operation of the receiving apparatus will be described.

As shown in FIG. 8, the cache message and the data broadcast content D1001 synchronized with the commercial associated with the broadcast program E are transmitted at 11:10. The message extracting unit 209 obtains the cache message, and the data extracting unit 210 obtains the data broadcast content D1001.

The data processing unit 211 stores the data broadcast content into the content storage unit 212 in accordance with the cache message.

At 11:10, the reproduction message is transmitted from the broadcasting station. The message extracting unit 209 obtains the reproduction message and outputs it to the data processing unit 211.

The data processing unit 211 checks whether the data broadcast content is stored in the content storage unit 212. In this example, the data broadcast content is stored in the content storage unit 212. When this happens, the data processing unit 211 interprets and executes the data broadcast content, and outputs the data broadcast content to the reproducing unit 207. In this way, the data broadcast content is reproduced and displayed, in synchronization with the commercial associated with the broadcast program E.

The data processing unit 211 deletes the data broadcast content from the content storage unit 212 after the above interpretation and execution of the data broadcast content.

At 11:20, the reproduction message is transmitted from the broadcasting station. The message extracting unit 209 obtains the reproduction message and outputs it to the data processing unit 211. The data processing unit 211 checks whether the data broadcast content is stored in the content storage unit 212. In this example, the data broadcast content is not stored in the content storage unit 212. When this happens, the data processing unit 211 stops displaying the currently displayed data broadcast content.

In the present embodiment, a data broadcast content is deleted from the content storage unit 212 after the data broadcast content is interpreted and executed. However, the data broadcast content may not be deleted, but stored for a certain time period, where the data broadcast contents are managed using a list.

In the present embodiment, the broadcasting station transmits the cache message so that the receiving apparatus caches the data broadcast content. However, the receiving apparatus may always check whether a data broadcast content to be cached is broadcast, and when the receiving apparatus has confirmed that a data broadcast content to be cached is broadcast, the receiving apparatus may cache the data broadcast content.

Contents information indicating whether or not a data broadcast content is to be cached may be attached to the data carousel of the data broadcast content, and may be transmitted together with the data broadcast content so the receiving apparatus can check each data broadcast content for this matter.

In the present embodiment, the reproduction start message and the reproduction stop message are immediate-type. However, these messages may be time-specifying-type messages that specify times when the messages are to be executed by the receiving apparatus.

In the examples shown in FIGS. 7 and 8, the pre-transmission period is set to 5 seconds. However, the pre-transmission period may be set to other than 5 seconds, in so far as the data carousel can be transmitted at least once. Considering the possibility that a transmission error may occur, however, it is preferable that the pre-transmission period is set to such a time period as enables the data carousel to be transmitted twice or more.

In the pre-transmission period, two data broadcast contents (one for a coming broadcast program and the other for a currently broadcast program) may be transmitted through one broadcasting band, by diving the broadcasting band for use.

The transmitting and receiving apparatuses shown in FIGS. 1 and 2 respectively may be achieved by allowing computers in the transmitting and receiving apparatuses to execute programs in which the functions of each element of these apparatuses shown in these drawings are described. Also, such programs may be loaded onto other transmitting and receiving apparatuses, via recording mediums or transmission mediums, to be executed by the apparatuses.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A broadcasting apparatus comprising:
a transmitting means for transmitting an interactive content as a data carousel over a span of a scheduled broadcasting time period; and
a transmission control means for controlling the transmitting means so as to (a) start pre-transmitting the interactive content a predetermined time period before the start of the scheduled broadcasting time period, and (b) repeatedly transmit a cache message that instructs a receiving apparatus to cache the interactive content into a storage unit in the receiving apparatus while the transmitting means pre-transmits the interactive content over a span of the predetermined time period.

2. The broadcasting apparatus of claim 1, wherein
the scheduled broadcasting time period spans from a time when the receiving apparatus is to start reproducing the interactive content to a time when the receiving apparatus is to end reproducing the interactive content.

3. The broadcasting apparatus of claim 1, wherein
the transmission control means controls the transmitting means so as to transmit a reproduction message that conveys that the interactive content cached in the storage unit in the receiving apparatus should be reproduced over the span of the scheduled broadcasting time period.

4. The broadcasting apparatus of claim 3, wherein
the reproduction message (a) specifies a time when a reproduction should start and (b) includes an instruction to start the reproduction at the specified time, and
the transmission control means repeatedly transmits the reproduction message while the transmitting means pre-transmits the interactive content over the span of the predetermined time period.

5. The broadcasting apparatus of claim 3, wherein
the reproduction message includes an instruction to start a reproduction immediately after the reproduction message is received, and
the transmission control means instructs the transmitting means to transmit the reproduction message at the start of the scheduled broadcasting time period.

6. The broadcasting apparatus of claim 3, wherein
the transmission control means includes:
a schedule storage unit for storing a time 1, a time 2, and a time 3 which correspond to the interactive content, the time 1 being a time when the transmitting means starts pre-transmitting the interactive content the predetermined time before the start of the scheduled broadcasting time period, the time 2 being the start of the scheduled broadcasting time period, and the time 3 being the end of the scheduled broadcasting time period;
a data carousel control unit for controlling the transmitting means to transmit the interactive content over a span of the time 1 to the time 3 stored in the schedule storage unit; and
a message control unit for instructing the transmitting means to repeatedly transmit the cache message over a span of the time 1 to the time 2 stored in the schedule storage unit, and instructing the transmitting means to transmit the reproduction message at the time 2.

7. The broadcasting apparatus of claim 1, wherein
the transmitting means further broadcasts a video content over the span of the scheduled broadcasting time period, the video content containing video and audio data, and
the interactive content is closely related to the video content.

8. The broadcasting apparatus of claim 7, wherein
the video content is a commercial and is synchronized with the interactive content.

9. The broadcasting apparatus of claim 7, wherein
the video content is one of a movie, a drama, a sports broadcast program, and a news broadcast program, and the interactive content is either an introduction or a detail of the video content.

10. The broadcasting apparatus of claim 7, wherein
the transmission control means controls the transmitting means so as to transmit a reproduction message that conveys that the interactive content cached in the storage unit in the receiving apparatus should be reproduced over the span of the scheduled broadcasting time period.

11. The broadcasting apparatus of claim 10, wherein
the reproduction message (a) specifies a time when a reproduction should start and (b) includes an instruction to start the reproduction at the specified time, and
the transmission control means repeatedly transmits the reproduction message while the transmitting means pre-transmits the interactive content over the span of the predetermined time period.

12. The broadcasting apparatus of claim 10, wherein
the reproduction message includes an instruction to start a reproduction immediately after the reproduction message is received, and
the transmission control means instructs the transmitting means to transmit the reproduction message at the start of the scheduled broadcasting time period.

13. The broadcasting apparatus of claim 10, wherein
the transmission control means includes:
a schedule storage unit for storing a time 1, a time 2, and a time 3 which correspond to the interactive content, the time 1 being a time when the transmitting means starts pre-transmitting the interactive content the predetermined time before the start of the scheduled broadcasting time period, the time 2 being the start of the scheduled broadcasting time period, and the time 3 being the end of the scheduled broadcasting time period;
a data carousel control unit for controlling the transmitting means to transmit the interactive content over a span of the time 1 to the time 3 stored in the schedule storage unit; and
a message control unit for instructing the transmitting means to repeatedly transmit the cache message over a span of the time 1 to the time 2 stored in the schedule storage unit, and instructing the transmitting means to transmit the reproduction message at the time 2.

14. A broadcasting system including a broadcasting apparatus and a receiving apparatus, wherein
the broadcasting apparatus comprises:
a transmitting means for transmitting an interactive content as a data carousel over a span of a scheduled broadcasting time period; and
a transmission control means for controlling the transmitting means so as to (a) start pre-transmitting the interactive content a predetermined time before the start of the scheduled broadcasting time period, and (b) repeatedly transmit a cache message that instructs a receiving apparatus to cache the interactive content into a storage unit in the receiving apparatus while the transmitting means pre-transmits the interactive content over a span of the predetermined time period, and
the receiving apparatus comprises:
a receiving means for receiving the interactive content transmitted as the data carousel;
a reproducing means for reproducing the received interactive content; and
a reception control means for controlling the reproducing means so as to (a) cache the interactive content into a storage unit, not reproducing the interactive content, while the interactive content is received before the start of a scheduled broadcasting time period, and (b) reproduce the interactive content during the scheduled broadcasting time period.

15. A broadcasting method of allowing a broadcasting apparatus to transmit a data carousel, comprising:
a first transmitting step for pre-transmitting an interactive content as the data carousel, starting a predetermined time before the start of a scheduled broadcasting time period;
a cache message transmitting step for repeatedly transmitting a cache message that instructs a receiving apparatus to cache the interactive content into a storage unit in the receiving apparatus while the interactive content is pre-transmitted in the first transmitting step; and
a second transmitting step for broadcasting the interactive content as the data carousel during the scheduled broadcasting time period.

16. The broadcasting method of claim 15, wherein
the scheduled broadcasting time period spans from a time when the receiving apparatus is to start reproducing the interactive content to a time when the receiving apparatus is to end reproducing the interactive content.

17. The broadcasting method of claim 16 further comprising:
a reproduction message transmitting step for transmitting a reproduction message that instructs the receiving apparatus to reproduce the interactive content cached in the storage unit when a transmission starts at some time in either the first transmitting step or the second transmitting step.

18. A computer readable medium for use with a computer, storing a computer program that allows a broadcasting apparatus to transmit a data carousel, the computer program allowing a computer in the broadcasting apparatus to execute:
a first transmitting step for pre-transmitting an interactive content as the data carousel, starting a predetermined time before the start of a scheduled broadcasting time period;
a cache message transmitting step for repeatedly transmitting a cache message that instructs a receiving apparatus to cache, the interactive content into a storage unit in the receiving apparatus while the interactive content is pre-transmitted in the first transmitting step and
a second transmitting step for broadcasting the interactive content as the data carousel curing the scheduled broadcasting time period.

19. A computer program that allows a broadcasting apparatus to transmit a data carousel, the computer program allowing a computer in the broadcasting apparatus to execute:
a first transmitting step for pre-transmitting an interactive content as the data carousel, starting a predetermined time before the start of a scheduled broadcasting time period;
a cache message transmitting step for repeatedly transmitting a cache message that instructs a receiving apparatus to cache the interactive content into a storage unit in the receiving apparatus while the interactive content is pre-transmitted in the first transmitting step; and
a second transmitting step for broadcasting the interactive content as the data carousel during the scheduled broadcasting time period.

* * * * *

UNITED STATES PATENT AND TRADEMARK OFFICE
CERTIFICATE OF CORRECTION

| | |
|---|---|
| PATENT NO. | : 7,013,479 B2 |
| APPLICATION NO. | : 09/834454 |
| DATED | : March 14, 2006 |
| INVENTOR(S) | : Toshiya Mori |

It is certified that error appears in the above-identified patent and that said Letters Patent is hereby corrected as shown below:

In Claim 18, Column 14, line 43, the (comma) "," after "cache" should be deleted.

In Claim 18, Column 14, line 48, "curing" should be deleted and replaced with --during--.

Signed and Sealed this

Twenty-second Day of August, 2006

JON W. DUDAS
*Director of the United States Patent and Trademark Office*